US007228538B1

(12) United States Patent
Burton et al.

(10) Patent No.: US 7,228,538 B1
(45) Date of Patent: Jun. 5, 2007

(54) METHOD, SYSTEM, AND PROGRAM FOR UPDATING FIRMWARE TO A STORAGE SYSTEM COMPRISED OF MULTIPLE CONTROLLERS

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/563,656

(22) Filed: May 2, 2000

(51) Int. Cl.
*G06F 9/44* (2006.01)
(52) U.S. Cl. ...................................... 717/170; 717/171
(58) Field of Classification Search ........ 717/168–178; 711/101, 170
See application file for complete search history.

(56) References Cited

U.S. PATENT DOCUMENTS

| | | | |
|---|---|---|---|
| 4,490,785 A | | 12/1984 | Strecker et al. |
| 4,654,778 A | | 3/1987 | Chiesa et al. |
| 4,799,215 A | * | 1/1989 | Suzuki ........................ 370/227 |
| 5,504,882 A | | 4/1996 | Chai et al. |
| 5,517,615 A | | 5/1996 | Sefidvash et al. |
| 5,530,913 A | | 6/1996 | Scholefield |
| 5,548,711 A | | 8/1996 | Brant et al. |
| 5,561,825 A | | 10/1996 | Yamagami et al. |
| 5,600,807 A | * | 2/1997 | Itoh et al. .................... 711/211 |
| 5,606,679 A | | 2/1997 | Cohn et al. |
| 5,640,530 A | | 6/1997 | Beardsley et al. |
| 5,675,577 A | | 10/1997 | Komatsu |
| 5,689,729 A | | 11/1997 | Inoue |
| 5,720,028 A | | 2/1998 | Matsumoto et al. |
| 5,761,518 A | * | 6/1998 | Boehling et al. .............. 710/1 |
| 5,802,547 A | | 9/1998 | Legvold |
| 5,922,077 A | | 7/1999 | Espy et al. |
| 5,966,301 A | * | 10/1999 | Cook et al. .................... 700/3 |
| 6,012,109 A | * | 1/2000 | Schultz ........................ 710/56 |
| 6,085,333 A | * | 7/2000 | Dekoning et al. .......... 711/101 |
| 6,094,702 A | * | 7/2000 | Williams et al. ............ 711/101 |
| 6,247,099 B1 | * | 6/2001 | Skazinski et al. ........... 711/141 |
| 6,463,504 B1 | * | 10/2002 | Ishibashi et al. ............ 711/114 |
| 6,502,176 B1 | * | 12/2002 | Kobayashi et al. ......... 711/170 |
| 6,507,881 B1 | * | 1/2003 | Chen .......................... 710/130 |
| 6,725,331 B1 | * | 4/2004 | Kedem ....................... 711/117 |

OTHER PUBLICATIONS

U.S. Appl. No. 09/561,656, filed May 2, 2000, entitled "Method, System, Program and Structure for Selecting a Preferred Path to a Storage Device".
U.S. Appl. No. 09/562,685, filed May 2, 2000, entitled "Method, System, and Program for Modifying Preferred Path Assignments to a Storage Device".
IBM, "IBM 7133 Serial Disk System Advanced Models D40 and T40", May 1999, G225-6798-02.
Mylex®, "SANArray™FFx", pp. 1-12.
SCSI, "SCSI-3 Primary Commands", Mar. 28, 1997, pp. 32-40.

* cited by examiner

*Primary Examiner*—Tuan Dam
*Assistant Examiner*—Chuck Kendall
(74) *Attorney, Agent, or Firm*—David W. Victor; Konrad Raynes & Victor LLP (57) ABSTRACT

Disclosed is a method, system, program, and data structure for updating code in a first and second controllers. The first and second controllers are capable of accessing storage regions in a storage device. The first controller receives a code update and signals the second controller. Access to the first controller is disabled and the code update is applied to the first controller. In response to the signaling, the second controller receives commands directed to all of the storage regions during the code update to the first controller.

26 Claims, 8 Drawing Sheets

FIG. 1

| Byte | Bit 7 | Bit 6 | Bit 5 | Bit 4 | Bit 3 | Bit 2 | Bit 1 | Bit 0 |
|---|---|---|---|---|---|---|---|---|
| 0-35 | Standard Inquiry Data ||||||||
| 36-43 | Unit Serial Number for LUN ||||||||
| 97 |  |  |  |  |  |  |  | PrefPath |
|  |  |  |  |  |  |  |  |  |

METHOD, SYSTEM, AND PROGRAM FOR UPDATING FIRMWARE TO A STORAGE SYSTEM COMPRISED OF MULTIPLE CONTROLLERS

CROSS-REFERENCE TO RELATED APPLICATIONS

This application is related to the following and commonly-assigned patent applications, all of which are filed on the same date herewith, and all of which are incorporated herein by reference in their entirety:

"Method, System, Program, and Data Structure For Selecting a Preferred Path to a Storage Device", to David A. Burton and Robert L. Morton, having application Ser. No. 09/561,639 filed May 2, 2000, now U.S. Pat. No. 6,601,128 and "Method, System, And Program For Modifying Preferred Path Assignments to a Storage Device" to David A. Burton and Robert L. Morton, having application Ser. No. 09/562,685 filed May 2, 2000, now U.S. Pat. No. 6,393,535.

BACKGROUND OF THE INVENTION

1. Field of the Invention

The present invention relates to a system, method, and program for updating code in a first and second controllers.

2. Description of the Related Art

In prior art storage systems, one or more host computers access a storage space maintained in a storage device through a storage controller. In mass storage systems, the storage device may comprise one or more Direct Access Storage Devices (DASDs), comprised of interconnected hard disk drives. The storage controller manages the flow of data from host systems to DASDs. Host systems view the physical storage space as a partition of Logical Unit Numbers (LUNs). The hosts will submit input/output (I/O) commands to a particular LUN, and the storage controller will translate the target LUN to a physical storage area.

To avoid total system failure in the event that one system component fails, storage controller subsystems incorporate redundant hardware components. For instance, one typical prior art storage subsystem includes multiple storage controller processors to provide hosts multiple paths to the same DASD and LUNs. In the event that one storage controller path fails, the path to the other storage controller can be used to access the DASD.

In high end storage controllers, such as the International Business Machines Corporation (IBM) 3990 and Enterprise System Storage Server,** a host may send an input/output (I/O) command to any host or controller 0I/O adaptor in the subsystem and the I/O adaptor would then route the I/O to the controller handling the target LUN of that I/O operation. With such prior art high end systems, the host does not need to know the controller that is primarily managing a particular LUN because the controllers include the interface circuitry to route the I/O to the primary controller. Such solutions require expensive interface hardware that is not feasible for lower cost storage subsystems. Lower cost storage subsystems also use two controllers, such as Small Computer System Interface (SCSI) or Fibre Channel controllers, that provide separate paths to the same DASD.

**Windows and NT are registered trademarks of Microsoft Corporation; AIX and OS/390 are registered trademarks of IBM and MVS and Fibre Channel Raid Storage Controller are trademarks of IBM.

In the prior art, to update the firmware or code in a subsystem comprised of multiple controllers, the entire subsystem is taken off-line while the firmware in both controllers is updated. The firmware is typically maintained in a programmable memory such as a flash memory. Once the programmable memory of the controllers is updated, the system may be brought back online. One disadvantage of this approach is that the host will not be able to access the data from the DASD during the firmware update. In many cases, the host may have a short timeout period causing a timeout when it cannot access data while the controllers are updating their firmware. To recover from such timeouts, the host will have to reboot, thereby disrupting clients accessing data through the subsystem. Further, even if the upgrade operations do not cause the host to timeout, host applications are still denied access to data during the upgrade to the new firmware. Thus, the operation of loading new firmware can be quite disruptive to all hosts and their attached clients accessing data through the subsystem.

Thus, there is a need in the art to provide an improved methodology for updating firmware code in controllers.

SUMMARY OF THE PREFERRED EMBODIMENTS

To overcome the limitations in the prior art described above, preferred embodiments disclose a method, system, and program for updating code in a first and second controllers. The first and second controllers are capable of accessing storage regions in a storage device. The first controller receives a code update and signals the second controller. Access to the first controller is disabled and the code update is applied to the first controller. In response to the signaling, the second controller receives commands directed to all of the storage regions during the code update to the first controller.

In further embodiments, after the code update is applied to the first controller, the first controller is signaled and access to the second controller is disabled. The code update is applied to the second controller. In response to signaling the first controller, the first controller receives commands directed to all of the storage regions during the code update to the second controller.

In further embodiments, signaling the first and second controller comprises communicating information on storage regions assigned to the controller according to a storage region assignment. During the code update at one controller, the other controller receives commands directed to the storage regions assigned to the controller according to the storage region assignment.

Preferred embodiments provide a technique for having one controller take control of the storage regions assigned to the other controller when the other controller is involved in a firmware update. This reassignment of storage regions to the controller that remains on-line to hosts during the firmware or other code update allows the hosts continual access to the data during the updated.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
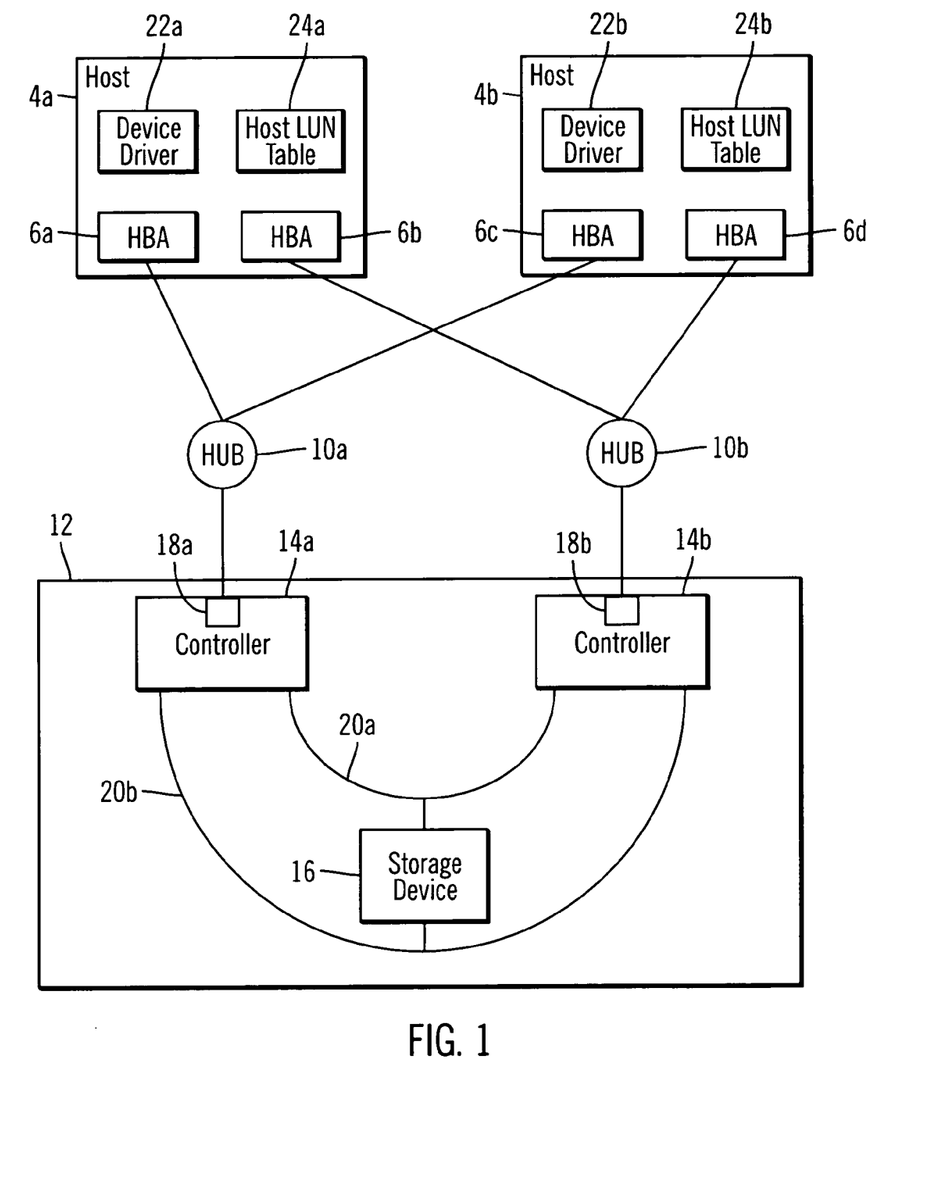
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include two host bus adaptors (HBAs) 6a, b and 6c, d, respectively. The HBAs 6a, b, c, d may comprise a Fibre Channel or Small Computer System Interface (SCSI) adaptor card or any other network adaptor card known in the art. The HBAs 6a, b, c, d allow the hosts 4a, b to communicate with storage controllers 14a, b via the hubs 10a, b. The hubs 10a, b may comprise the IBM Fibre Channel Storage Hub or Switch, the IBM SAN Fibre Channel Switch, or any other switching device known in the art. A storage subsystem 12 includes two controllers 14a, b that provide access to a storage device 16, such as a DASD. Each controller 14a, b includes at least one port 18a, b, respectively, through which a host 4a, b accesses the controller 14a, b. In preferred implementations, both controllers 14a, b can access any storage location in the storage device 16. The controllers 14a, b may comprise the IBM Fibre Channel Raid Storage Controller or any other storage controller known in the art that provides one or more hosts access to a single storage space or storage devices. Lines 20a, b provide communication from the controllers 14a, b to the storage device 16 such that either controller 14a, b can use the lines 20a, b to access any part of the storage device 16. The lines 20a, b may be implemented using the Fibre Channel interface. In such case, the controllers 14a, b would include fibre channel adaptors and the lines 20a, b would comprise cables connected to the controllers 14a, b to form Fibre Channel arbitrated loops (FCAL) to interconnect the controllers 14a, b to the storage device 16 components, e.g., hard disk drives.

In alternative embodiments, multiple hosts may connect to a single storage controller that provides access to a DASD. Storage subsystems that provide access to multiple hosts include high end storage controllers, such as the IBM 3990 and Enterprise Storage Server storage controller products, as well as others. Thus, the term "storage controller" or "controller" as used herein refers to any storage controller, storage server, control unit, or any other computing device that manages input/output (I/O) requests from multiple host systems.

Figure 2:
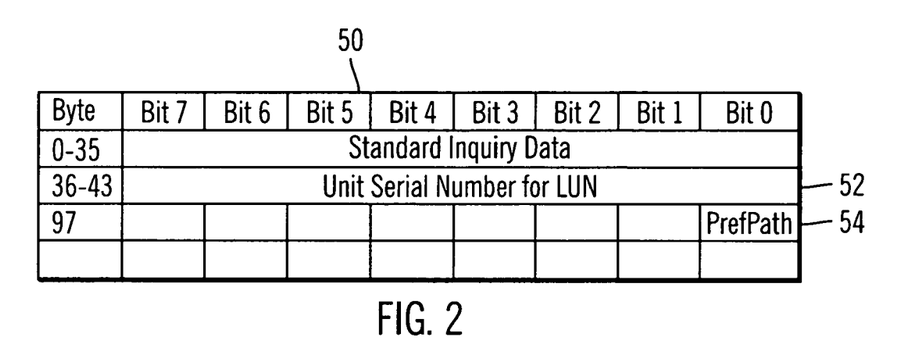
FIG. 2 illustrates the format of inquiry data in accordance with preferred embodiments of the present invention.

Preferred embodiments are implemented using the SCSI protocol. In such case, the controllers 14a, b would provide inquiry data for each LUN, including information concerning parameters of the controller 14a, b and the LUN. FIG. 2 illustrates inquiry data 50 in accordance with the preferred embodiments. Bytes 0 through 35 of the Inquiry data 50 includes the fields found in the inquiry data record described in the "SCSI 3 Primary Commands (SPC)", proposed draft T10/995D revision 11a, dated Mar. 28, 1997 (Copyright ANSI). Preferred embodiments add an eight byte unique serial number field 52, at bytes 36–43, that provides a world wide unique identifier of the LUN for which the inquiry data 50 is maintained. A preferred path field 54 in the inquiry data 50 indicates which controller 14a, b is the preferred target of I/O operations toward the LUN represented by the inquiry data 50. The preferred path assignment is maintained in configuration data.

During configuration, one of the controllers 14a or b would allocate the LUNs between the controllers 14a, b, where the controller 14a, b to which the LUN is allocated comprises the preferred path for that LUN. This allocation of LUNs to a preferred path controller is maintained in configuration data indicating preferred and non-preferred controllers for each LUN. The allocation of LUNs to controllers 14a, b may be determined using a load balancing algorithm to assign LUNs to controllers 14a, b in a manner that evenly distributes the I/O processing load between controllers in order to prevent overburdening one of the controllers 14a, b with I/O operations. Alternative techniques may be used to allocate the LUNs to the controllers 14a, b, such as a user specified configuration, random assignment, etc. Preferably, the LUNs are allocated such that each controller 14a, b handles an equivalent number of I/O operations and total bytes accessed for the workloads expected on the LUNs. Each controller maintains the preferred path allocation of the LUNs in non-volatile storage to ensure that all hosts will have the same view of the preferred path for each LUN. When returning inquiry data to a host 4a, b, the controller 14a, b would use the configuration data indicating the preferred path assignment to update the preferred path field 54 of the inquiry data 50 to indicate the preferred path to the LUN. If the subsystem 12 includes two controllers 14a, b, then the preferred path field 54 may comprise one bit, where a zero indicates one controller and a one indicates the other. The controller 14a, b not identified in the preferred path field 54 would be the non-preferred controller.

Figure 3:
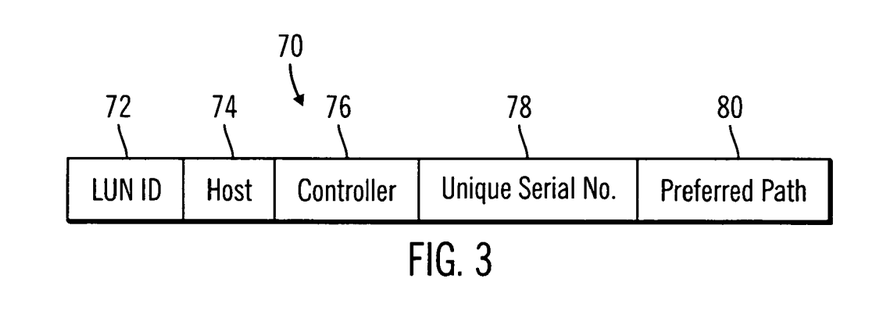
FIG. 3 illustrates an entry in a LUN path table in accordance with preferred embodiments of the present invention.

Each host system 4a, b includes a device driver 22a, b which is used to select a path to use for the I/O operation. A controller path comprises the path from one host 4a, b to the hub 10a, b which connects to a particular controller 14a, b. During initialization, the device driver 22a, b builds a LUN path table 24a, b. FIG. 3 illustrates the fields in an entry 70 of the LUN path table 24a, b maintained in the hosts 4a, b. An entry 70 in the LUN path table 24a, b includes a LUN ID field 72 indicating a LUN number. A host field 74 and controller field 76 indicate a path from a host to a controller for which the entry 70 is maintained. The unique serial number field 78 indicates a unique identifier of the LUN, such as a world wide name. The unique serial number for the storage space is maintained because different hosts 4a, b may assign different LUN numbers to the same physical storage space. The preferred path field 80 indicates whether the host-to-controller path specified in fields 74 and 76 is the preferred path to the LUN, i.e., a boolean value indicating preferred path or not. With the information in the LUN path table, the host 4a, b can determine multiple paths to the same LUN using the different controllers 14a, b and whether a particular controller 14a, b identified in the entry is the preferred or non-preferred controller.

Figure 4:
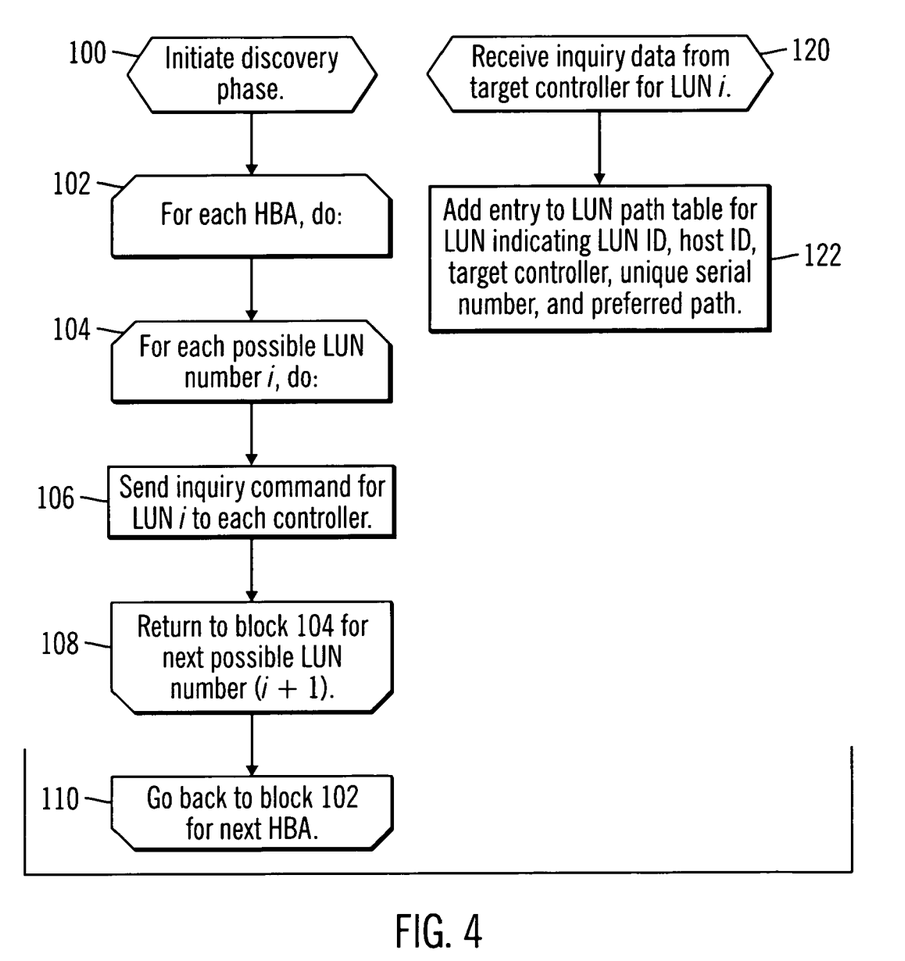
FIG. 4 illustrates logic implemented in a host device driver to build a LUN path table in accordance with preferred embodiments of the present invention.

FIG. 4 illustrates logic implemented in the host device driver 22a, b to build a LUN path table 24a, b indicating preferred path information for a path to a LUN during 4a, b host initialization. Control begins at block 100 with the device driver 22a, b initiating a discovery phase during initialization. The device driver 22a, b then performs a loop at block 102 to 110 for each host bus adaptor (HBA) 6a, b, c, d in the host 4a, b. Then for each host bus adaptor, another loop is performed at blocks 104 to 108 for each possible LUN number i. For each LUN number i, the device driver 22a, b sends (at block 106) an inquiry command, such as the SCSI inquiry command, for LUN number i to each controller 14a, b. At block 120, the host 4a, b receives the inquiry data 50 for a LUN number in response to the inquiry command sent at block 104. Upon receiving the inquiry data 50, the device driver 22a, b inserts an entry 70 in the LUN path table 24a, b indicating the LUN number in field 72; the host and controller ID information in fields 74 and 76, respectively, which specifies the path from the host to the controller; the unique serial number for the LUN in field 78; and whether the host-to-controller path is the preferred path in the preferred path field 80, i.e., the controller 14a, b identified in the controller field 76 is the preferred controller. In this way, the path information for each host adaptor (HBA) and LUN is included in the LUN path table 24. Because a host adaptor is connected to a HUB that connects directly to a controller, specification of a host adaptor specifies the controller.

Figure 5:
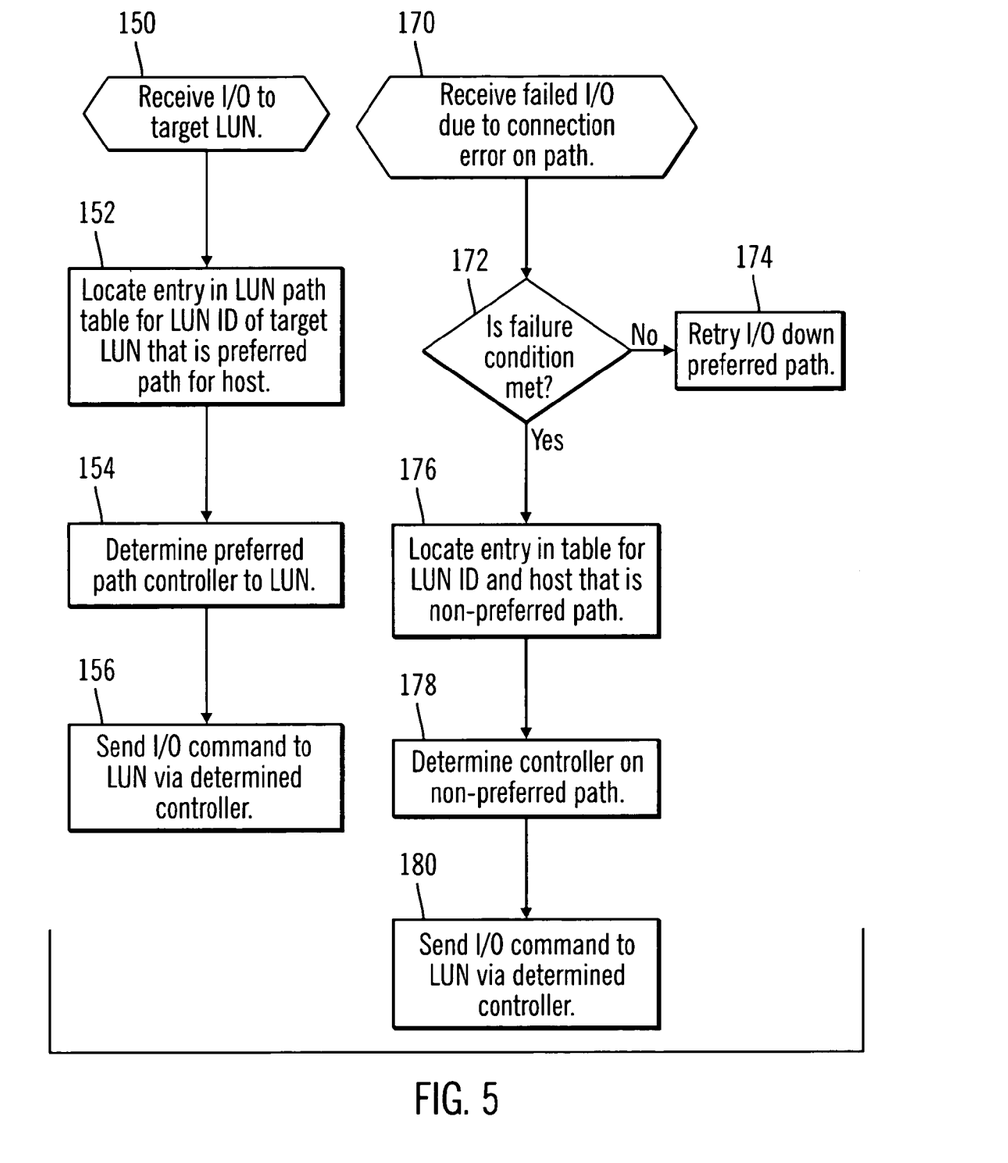
FIG. 5 illustrates logic implemented in a host device driver to select a path for an operation in accordance with preferred embodiments of the present invention.

FIG. 5 illustrates logic implemented in the host device drivers 18a, b to select a path to a controller 14a, b for an operation, such as an input/output (I/O) operation or any other command type that is executed with respect to a LUN. Control begins at block 150 with the device driver 22a, b receiving an I/O command to a target LUN. The device driver 22a, b will scan the LUN path table 24a, b to locate (at block 152) an entry for the preferred path (having the preferred path field 80 "on") for the target LUN ID having a host field 74 including the host ID of the initiator host driving the I/O operation The device driver 22a, b then determines (at block 154) from the controller field 76 the controller 14a, b that is the preferred controller, i.e., for the entry having the preferred path field 54 "on". The device driver 22a, b then sends (at block 156) the I/O command down the path to the determined controller 14a or b to execute.

If the host 4a, b receives a message indicating that an I/O failed at block 170, then the device driver 22a, b will check (at block 172) for a failure condition, e.g., whether there have already been the maximum number of consecutive failed retries for a given I/O command. If the failure condition is not met, then the device driver 22a, b will retry (at block 174) the I/O operation down the preferred path. Otherwise, the device driver 22a, b will locate (at block 176) an entry in the LUN path table 24a, b for the target LUN ID and initiating host having the non-preferred path. The device driver 22a, b will then determine (at block 178) the controller 14a or b for this entry (from the controller field 76) and send (at block 180) the I/O operation down the non-preferred path to the determined controller 14a or b.

Preferred embodiments provide modifications to the device driver 22a, b operations to build a LUN path table 24a, b indicating preferred paths to a particular LUN for the host 4a, b. The device driver 22a, b would then use this LUN path table 24a, b to select one of the controllers 14a, b for an I/O operation against a LUN which may be accessed through either controller 14a, b. By using a preferred controller, the host 4a, b reduces the need for the controllers 14a, b to cross-communicate to manage I/O operations to the same target LUN or storage device because the host 4a, b is directing all I/Os to only one of the storage controllers.

With preferred embodiments, after a certain number of failed attempts to complete the I/O operation, the host 4a, b will select the non-preferred controller. Thus a failure at any point in the path from the host 4a, b to the hubs 10a, b to the controllers 14a, b may result in the host 4a, b selecting an alternate, non-preferred controller that avoids the path to the controller containing the failure. At this point, selection of the non-preferred controller would require the controllers 14a, b to engage in the cross-communication, in a manner known in the art, to manage the execution of I/O commands against the same LUN, which may result in delays in I/O processing. However, the preferred technique minimizes any delays necessitated by cross-controller 14a, b management of I/Os to the same LUN because the preferred embodiments tend to always use the same path or one controller 14a, b for I/Os to a particular LUN unless there is a failure.

Preferred embodiments further improve load balancing of I/O processing between the controllers 14a, b because the controllers 14a, b use load balancing optimization to allocate LUN numbers to controllers 14a, b, and the hosts 4a, b use this preferred controller, designated according to load balancing methods, to access the LUN.

Thus, preferred embodiments optimize I/O processing by using a preferred path to access the LUN selected according to load balancing optimization, and at the same time provide a mechanism for an alternative failback controller and path in the event there is a failure at any point in the path.

Still further, the preferred embodiments allow for load balancing, optimization of I/O processing, and failover and failback to a surviving controller for those lower cost subsystems that only include dedicated ports 18a, b on each controller 14a, b.

Updating the Firmware of the Controllers

Figure 6:
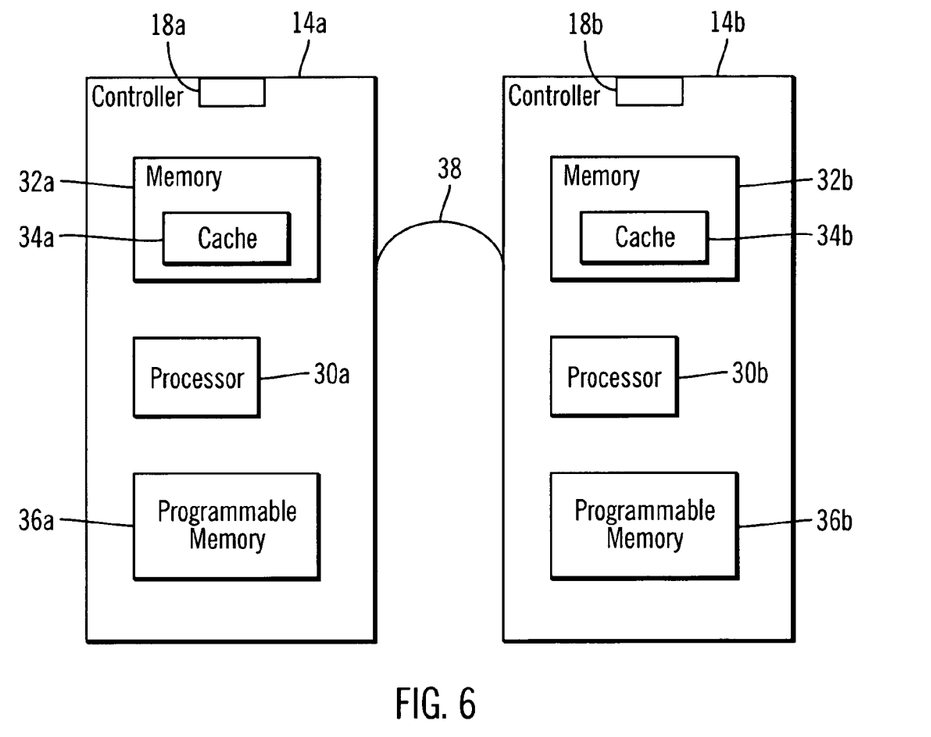
FIG. 6 illustrates a block diagram of the components within each controller in which preferred embodiments are implemented.

FIG. 6 illustrates further details of the components within the controllers 14a, b in which preferred embodiments are implemented. Each controller 14a, b includes a processor 30a, b, which may comprise any microprocessor device known in the art. The processor 30a, b operates under control of firmware maintained in the programmable memory 36a, b, which may comprise any programmable memory device known in the art, such as a flash memory, electronically erasable programmable read only memory (EEPROM), field programmable gate array (FPGA), etc. The processors 30a, b utilize work areas in memory 32a, b, which may comprise any volatile memory device known in the art, during operations. A portion of each memory 32a, b includes a cache 34a, b which the processors 30a, b use to cache updates from the hosts 4a, b before they are destaged to the storage device 16. A line 38 provides for communication between the controllers 14a, b.

In preferred embodiments, during write operations, the processors 30a, b may handle writes from the hosts 4a, b using DASD fast write (DFW) by writing updates to the local cache and to the cache of the other controller. In this way, if the controller goes down, then the updates are still maintained in the cache of the surviving controller 14a, b.

For instance, during normal operations, processor 30a would apply updates to both the local cache 34a and the cache 34b in the other controller 14b. Such data communications between the processors may occur between line 38. Once data is destaged from the cache 34a, then the destaged update may be discarded from the cache 34b.

Figure 7:
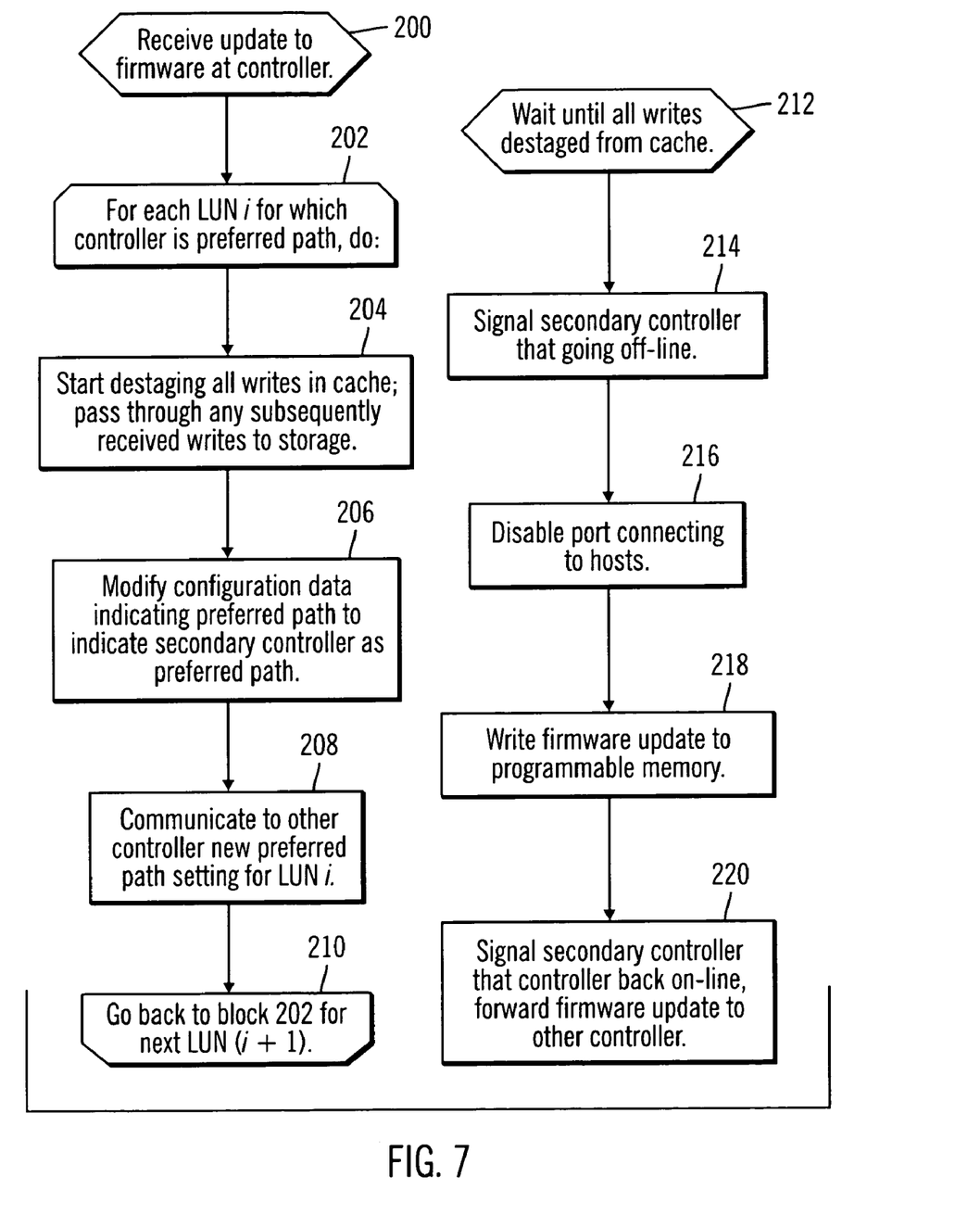
FIGS. 7 and 9 illustrate logic implemented in a primary controller to update the firmware in accordance with preferred embodiments of the present invention.
Figure 8:
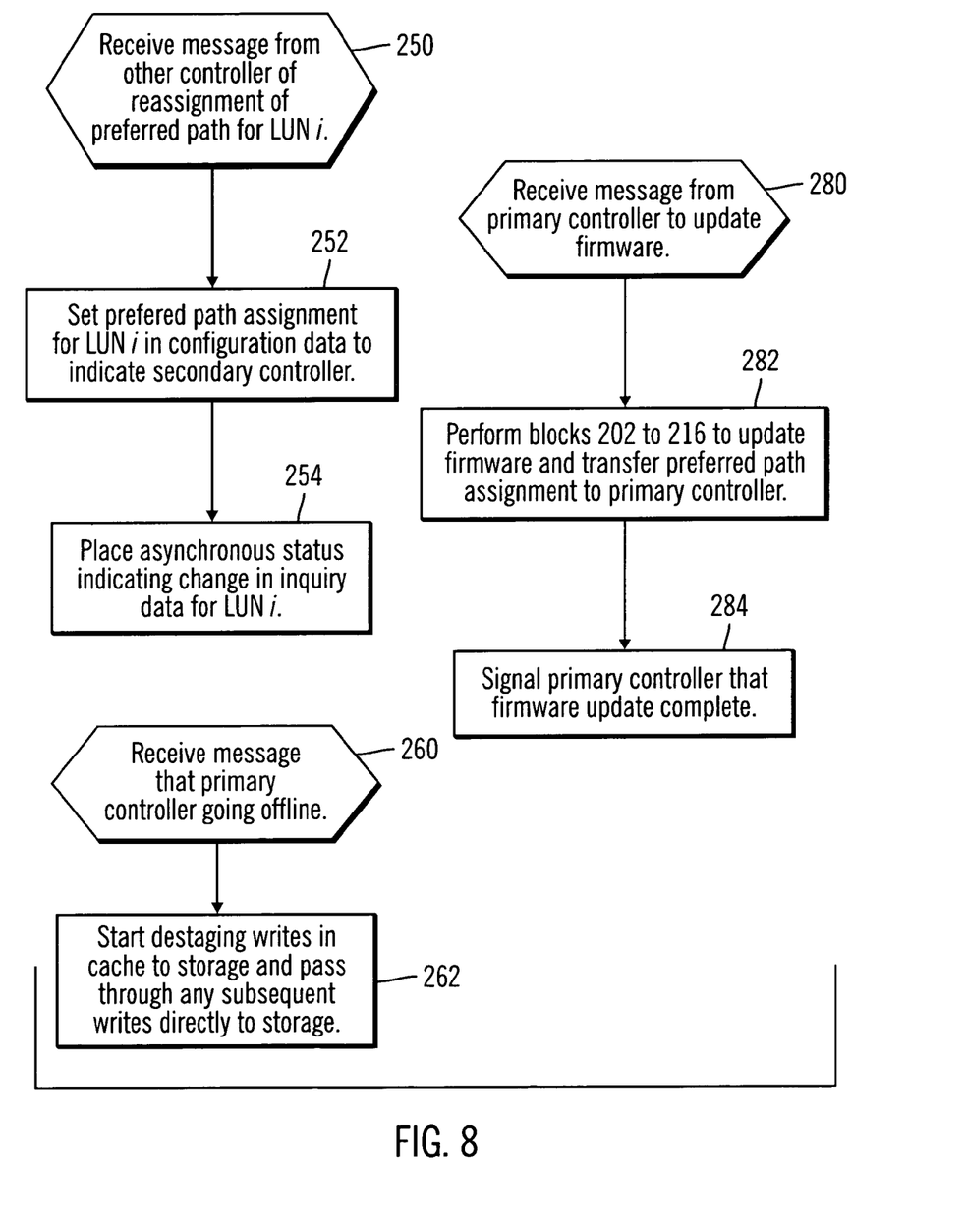
FIG. 8 illustrates logic implemented in a secondary controller to update the firmware in accordance with preferred embodiments of the present invention.
Figure 9:
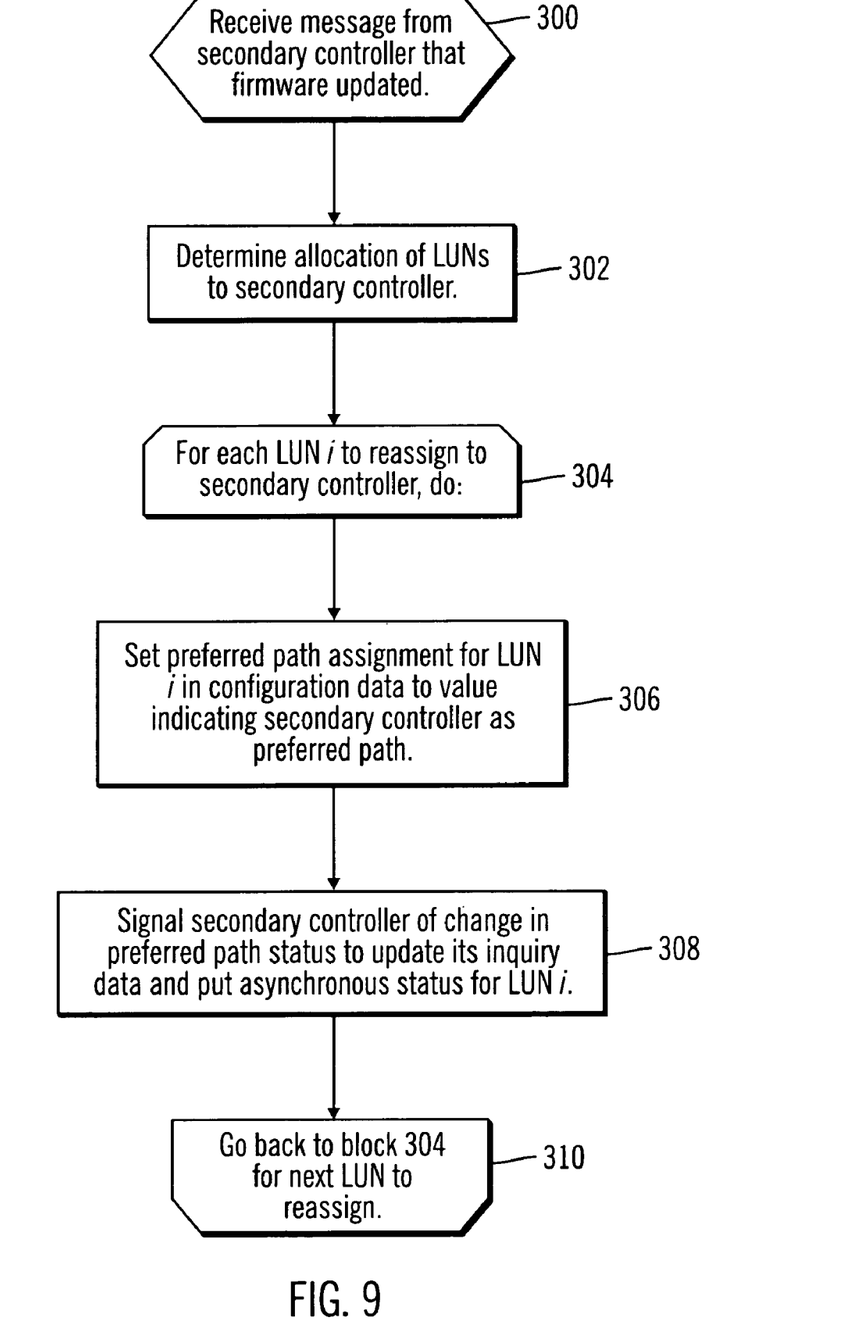

FIGS. 7–9 illustrate logic implemented in the controllers 14a, b, and the processors 30a, b in particular, to apply firmware updates to the programmable memories 36a, b. The logic of FIGS. 7–9 may be implemented in the programmable memory 36a, b or any other memory device providing code to the processors 30a, b. In preferred embodiments one controller functions as the primary controller, e.g., controller 14a, and the other as the secondary controller, e.g., controller 14b. The primary controller 14a may perform the initialization and configuration operations at boot-up time, such as determining the designation of the controllers 14a, b as the preferred controller for each LUN. FIGS. 7 and 9 illustrate logic implemented in the primary controller 14a to handle a firmware update to the programmable memory 36a. FIG. 8 illustrates logic implemented in the secondary controller 14b to handle the firmware update to programmable memory 36b.

With respect to FIG. 7, control begins at block 200 with the primary controller 14a receiving a firmware update. The primary processor 30a would store the firmware in an area of memory 32a that would likely not include the cache 34a memory caching updates. The primary processor 30a then performs a loop at blocks 202–210 for each LUN i for which the primary controller 14a is the preferred controller. For those LUNs where the primary controller 14a is the preferred controller, the primary processor 30a would start destaging (at block 204) all writes in the cache 34a to the storage device and pass any subsequently received writes immediately to the storage device 16 without caching them in the secondary controller 14b cache 34b. The processor 30a would then modify (at block 206) the configuration data indicating preferred and non-preferred controllers to indicate that the secondary controller 14b is the preferred controller and preferred path to LUN i. The processor 30a would then communicate (at block 208) to the other controller over communication path 38 the new preferred path setting for LUN i.

After performing steps 204–208 for every LUN i for which the primary controller 14a is the preferred controller and after all writes are destaged from cache 34a (at block 212), the processor 30a then signals (at block 214) the secondary controller 14b that the primary controller 14a is going off-line and disables (at block 216) the port 18 so that the hosts 4a, b are unable to communicate with the primary controller 14a. After disabling the port, the processor 30a would write (at block 218) the firmware update to the programmable memory 36a. After completing the firmware update, the processor 30a signals (at block 220) the secondary controller 14b, and secondary processor 30b therein, that the primary controller 14a is back on-line. The primary controller 14a would forward the firmware update to the secondary controller 14a.

With respect to FIG. 8, block 250 represents the state where the secondary controller 14b processor 30b receives the message from the other controller (sent at block 208 in FIG. 7) of the change in preferred path assignment for LUN i. The processor 30b sets (at block 252) the preferred path assignment in the configuration data to indicate the secondary controller 14b as the preferred path for LUN i and places (at block 256) asynchronous status for LUN i indicating a change to the inquiry data for LUN i. The hosts 4a, b would be alerted of the asynchronous status indicating a change in inquiry data, and send new inquiry commands to obtain the modified inquiry data for LUN i. After receiving the modified inquiry data, the hosts 4a, b would access LUN i using the secondary controller 14b as the preferred path.

Block 260 represents the state where the secondary controller 14a receives the message (set at block 214 in FIG. 7) that the primary controller 14a is going off-line to apply the firmware update. In response, the secondary processor 30b starts (at block 262) destaging writes from the 34b cache and processes updates in a "pass-through" mode where writes are sent directly to the storage device 16 and not cached.

Block 280 represents the state where the secondary controller 14b receives a message (sent at block 220 in FIG. 7) from the primary controller 14a via line 38 to update the firmware and receives the actual firmware update, which it may then buffer in the non-cache portions of the memory 32b. In response, the secondary processor 30b performs steps 202 to 216 in FIG. 7 to reassign preferred paths to the primary controller 14a, destage all writes, disable the port 18b, and then apply the firmware update to the programmable memory 36b. After applying the firmware update, the secondary processor 30b signals (at block 284) the primary controller 14a that the firmware update is complete.

FIG. 9 illustrates logic implemented in the primary controller 14a to perform after the secondary controller 14b updates the firmware. Control begins at block 300 with the primary controller 14a receiving the message (sent at block 284 in FIG. 8) from the secondary controller 14b that the firmware update is completed. The primary controller 14a determines (at block 302) the initial allocation of LUNs assigned to the secondary controller 14b as the preferred controller. This initial allocation may be determined using load balancing, configured assignment, etc. For each LUN i to reassign to the secondary controller 14b, the primary controller 14a performs steps 306 and 308. At block 306, the primary controller sets (at block 306) the configuration data indicating the preferred path for LUN i to indicate the secondary controller 14b as the preferred path. The primary controller 14a then signals (at block 308) the secondary controller 14b of the change in preferred path status to allow the secondary controller 14b to update its inquiry data and place asynchronous status for LUN i.

With the preferred embodiments, firmware updates are allowed to proceed while one of the controllers 14a, b remains active to handle commands and I/O requests from the hosts 4a, b. Moreover, preferred embodiments alter an initial preferred path assignment when taking a controller offline to perform a firmware update so that the hosts 4a, b will automatically send their requests to the on-line controller 14a, b, thereby avoiding having to send requests to the offline controller. After the firmware updates are completed, the controllers 14a, b will return to their initial assignment of preferred paths to controllers as described above. In this way, preferred embodiments provide a technique for maintaining at least one controller always active during firmware updates so that the hosts 4a, b have continual access to data.

CONCLUSION

The following describes some alternative embodiments for accomplishing the present invention.

The preferred embodiments may be implemented as a method, apparatus or information bearing media using standard programming and/or engineering techniques to produce software, firmware, hardware, or any combination thereof.

The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred embodiments, the storage subsystem 12 included two controllers 14a, b and one port 18a, b on each controller. In further embodiments, the subsystem 12 may include more than two controllers and more than one port on each controller. Further, there may be more than one path from any one host to each controller.

The preferred logic of FIGS. 4–9 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Preferred embodiments described particular counters, data structures and algorithms for measuring the point at which the preferred path should be reassigned. In alternative embodiments, different data structures and algorithms may be used to determine the point at which the preferred path should be reassigned to avoid communication delays resulting from commands for a LUN sent down the non-preferred path.

Preferred embodiments were described with respect to SCSI commands, such as the SCSI inquiry command used to obtain inquiry data from a SCSI server. In non-SCSI embodiments, different commands may be used to obtain the inquiry data for a LUN. In such case, the format of the inquiry data the controllers return may differ.

In summary, preferred embodiments disclose a method, system, and program for for updating code in a first and second controllers. The first and second controllers are capable of accessing storage regions in a storage device. The first controller receives a code update and signals the second controller. Access to the first controller is disabled and the code update is applied to the first controller. In response to the signaling, the second controller receives commands directed to all of the storage regions during the code update to the first controller.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating code in a first and second controllers, wherein the first and second controllers are capable of accessing storage regions in a storage device, and wherein host systems communicate Input/Output (I/O) requests directed to the storage regions to one of the first and second controllers, comprising:
   providing a storage region assignment of storage regions assigned to the first and second controllers, wherein commands to one storage region are directed to the first or second controller to which the storage region is assigned;
   receiving a code update at the first controller;
   communicating to the second controller information on the storage regions assigned to the first controller according to the storage region assignment in response to receiving the code update;
   enabling the host systems access to revised storage region assignment information to cause the host systems to send I/O requests to storage regions assigned to the first controller according to the storage region assignment to the second controller during the code update at the first controller;
   disabling access to the first controller; and
   applying the code update to the first controller, wherein the second controller receives commands directed to the storage regions assigned to the first controller during the code update to the first controller.

2. The method of claim 1, wherein after the code update is applied to the first controller, further comprising:
   signaling the first controller;
   disabling access to the second controller; and
   applying the code update to the second controller, wherein in response to signaling the first controller, the first controller receives commands directed to the storage regions assigned to the second controller during the code update to the second controller.

3. The method of claim 1, further comprising:
   updating a data structure to indicate that the storage regions assigned to the first controller according to the storage region assignment are assigned to the second controller in response to receiving the information, wherein enabling the host systems access to revised storage region assignment information comprises providing asynchronous status to alert the host systems, wherein in response to the asynchronous status, the host systems access the updated data structure to determine the revised storage region assignment information.

4. The method of claim 2,
   wherein signaling the first controller further comprises communicating to the first controller information on the storage regions assigned to the second controller, wherein during the code update at the second controller, the first controller receives commands directed to the storage regions assigned to the second controller according to the storage region assignment.

5. The method of claim 4, further comprising:
   updating a data structure to indicate that the storage regions assigned to the second controller are assigned to the first controller in response to receiving the information; and
   providing asynchronous status to alert the host systems accessing the first controller, wherein in response to the asynchronous status, the the host systems access the updated data structure to determine a reassignment of storage regions from the second controller to the first controller.

6. The method of claim 1, wherein after the code update to the first and second controllers, further comprising:
reassigning the storage regions to the first and second controllers according to the storage region assignment; and
communicating the reassignment of the storage regions to the second controller, wherein after the reassignment of the storage regions, the first and second controllers receive commands directed to the storage regions according to the storage region assignment.

7. The method of claim 1, further comprising:
destaging updates in a cache to the storage device before disabling access to the first controller.

8. The method of claim 1, wherein prior to disabling access to the first controller, updates are cached in a first controller cache and a second controller cache, wherein during the code update, the second controller passes writes through to the storage region without caching the updates in the first controller cache.

9. The method of claim 1, wherein the storage region comprises a logical unit number (LUN).

10. A system for updating code and in communication with host systems that communicate Input/Output (I/O) directed to storage regions in a storage device, comprising:
a first and second controllers, both capable of accessing the storage regions in the storage device;
a storage region assignment of storage regions to the first and second controllers, wherein commands to one storage region are directed to the first or second controller to which the storage region is assigned;
program logic capable of causing the first controller to perform:
  receiving a code update;
  communicating to the second controller information on the storage regions assigned to the first controller according to the storage region assignment in response to receiving the code update;
  disabling access to the first controller; and
  applying the code update to the first controller, wherein the second controller receives commands directed to the storage regions assigned to the first controller during the code update to the first controller; and
program logic capable of causing the second controller to perform operations to enable the host systems access to revised storage region assignment information to cause the host systems to send I/O requests to storage regions assigned to the first controller according to the storage region assignment to the second controller during the code update at the first controller.

11. The system of claim 10, further comprising program logic capable of causing the second controller to perform, after the code update is applied to the first controller:
signaling the first controller;
disabling access to the second controller; and
applying the code update to the second controller, wherein in response to signaling the first controller, the first controller receives commands directed to the storage regions assigned to the second controller during the code update to the second controller.

12. The system of claim 10, wherein the program logic is further capable of causing the first controller to perform:
updating a data structure to indicate that the storage regions assigned to the first controller according to the storage region assignment are assigned to the second controller in response to receiving the information, wherein enabling the host systems access to revised storage region assignment information comprises providing asynchronous status to alert the host systems, wherein in response to the asynchronous status, the host systems access the updated data structure to determine the revised storage region assignment information.

13. The system of claim 11, wherein the program logic for signaling the first controller further comprises communicating to the first controller information on the storage regions assigned to the second controller, wherein during the code update at the second controller, the first controller receives commands directed to the storage regions assigned to the second controller according to the storage region assignment.

14. The system of claim 13, wherein the program logic is further capable of causing the second controller to perform:
updating a data structure to indicate that the storage regions assigned to the second controller are assigned to the first controller in response to receiving the information; and
providing asynchronous status to alert the host systems accessing the first controller, wherein in response to the asynchronous status, the the host systems access the updated data structure to determine a reassignment of storage regions from the second controller to the first controller.

15. The system of claim 10, wherein after the code update to the first and second controllers, the program logic is further capable of causing the first controller to perform:
reassigning the storage regions to the first and second controllers according to the storage region assignment; and
communicating the reassignment of the storage regions to the second controller, wherein after the reassignment of the storage regions, the first and second controllers receive commands directed to the storage regions according to the storage region assignment.

16. The system of claim 10, wherein the program logic is further capable of causing the first controller to perform:
destaging updates in a cache to the storage device before disabling access to the first controller.

17. The system of claim 10, wherein prior to disabling access to the first controller, updates are cached in a first controller cache and a second controller cache, wherein during the code update, the second controller passes writes through to the storage region without caching the updates in the first controller cache.

18. The system of claim 10, wherein the storage region comprises a logical unit number (LUN).

19. A computer readable device including at least one program for updating code in a first and second controllers, wherein the first and second controllers are capable of accessing storage regions in a storage device, and wherein host systems communicate Input/Output (I/O) requests directed to the storage regions to the first and second controllers, wherein the at least one program in the computer readable device is enabled to cause at least one of the controllers to perform:
providing storage region assignment of storage regions to the first and second controllers, wherein commands to one storage region are directed to the first or second controller to which the storage region is assigned;
receiving a code update at the first controller;
communicating to the second controller information on the storage regions assigned to the first controller according to the storage region assignment in response to receiving the code update;

enabling the host systems access to revised storage region assignment information to cause the host systems to send I/O requests to storage regions assigned to the first controller according to the storage region assignment to the second controller during the code update at the first controller;

disabling access to the first controller; and applying the code update to the first controller, wherein the second controller receives commands directed to the storage regions assigned to the first controller during the code update to the first controller.

20. The computer readable device of claim 19, wherein after the code update is applied to the first controller, further enabled to cause at least one of the controllers to perform:

signaling the first controller;

disabling access to the second controller; and applying the code update to the second controller, wherein in response to signaling the first controller, the first controller receives commands directed to the storage regions assigned to the second controller during the code update to the second controller.

21. The computer readable device of claim 19, further enabled to cause at least one of the controllers to perform:

updating a data structure to indicate that the storage regions assigned to the first controller according to the storage region assignment are assigned to the second controller in response to receiving the information, wherein enabling the host systems access to revised storage region assignment information comprises providing asynchronous status to alert the host systems, wherein in response to the asynchronous status, the host systems access the updated data structure to determine the revised storage region assignment information.

22. The computer readable device of claim 20, wherein signaling the first controller further comprises communicating to the first controller information on the storage regions assigned to the second controller, wherein during the code update at the second controller, the first controller receives commands directed to the storage regions assigned to the second controller according to the storage region assignment.

23. The computer readable device of claim 22, enabled to cause at least one of the controllers to perform:

updating a data structure to indicate that the storage regions assigned to the second controller are assigned to the first controller in response to receiving the information; and providing asynchronous status to alert the host sytems accessing the first controller, wherein in response to the asynchronous status, the the host systems access the updated data structure to determine a reassignment of storage regions from the second controller to the first controller.

24. The computer readable device of claim 19, further enabled to cause after the code update to the first and second controllers at least one of the controllers to perform:

reassigning the storage regions to the first and second controllers according to the storage region assignment; and communicating the reassignment of the storage regions to the second controller, wherein after the reassignment of the storage regions, the first and second controllers receive commands directed to the storage regions according to the storage region assignment.

25. The computer readable device of claim 19, further enabled to cause at least one of the controllers to perform:

destaging updates in a cache to the storage device before disabling access to the first controller.

26. The computer readable device of claim 19, wherein prior to disabling access to the first controller, updates are cached in a first controller cache and a second controller cache, wherein during the code update, the second controller passes writes through to the storage region without caching the updates in the first controller cache.

* * * * *